United States Patent
Greenblatt et al.

(10) Patent No.: US 9,920,547 B1
(45) Date of Patent: Mar. 20, 2018

(54) BICYCLE STORAGE UNIT

(71) Applicant: Everlast Climbing Industries, Inc., Mendota Heights, MN (US)

(72) Inventors: Joel Greenblatt, Wauwatosa, WI (US); Andrew Patrick Kennedy Lageson, Minneapolis, MN (US)

(73) Assignee: EVERLAST CLIMBING INDUSTRIES, INC., Minneapolis, MN (US)

( * ) Notice: Subject to any disclaimer, the term of this patent is extended or adjusted under 35 U.S.C. 154(b) by 0 days.

(21) Appl. No.: 15/270,825

(22) Filed: Sep. 20, 2016

(51) Int. Cl.
*E04H 6/00* (2006.01)
*E04B 1/32* (2006.01)
*B62H 3/08* (2006.01)
*E04B 1/00* (2006.01)
*E04B 1/08* (2006.01)
*E04B 1/12* (2006.01)

(52) U.S. Cl.
CPC ........... *E04H 6/005* (2013.01); *B62H 3/08* (2013.01); *E04B 1/3205* (2013.01); *E04B 1/08* (2013.01); *E04B 1/12* (2013.01); *E04B 2001/0053* (2013.01); *E04B 2001/327* (2013.01)

(58) Field of Classification Search
CPC ......... E04H 6/005; Y10S 52/14; B65D 85/68; B65D 2585/6862; B62H 3/04; B62H 3/08; B62H 5/005; B62H 5/001; B62H 3/00
USPC ............. 52/79.1, 64, 66, DIG. 15; D12/402; D25/16, 18
See application file for complete search history.

(56) References Cited

U.S. PATENT DOCUMENTS

| | | | | |
|---|---|---|---|---|
| 1,572,790 A * | 2/1926 | Grigsby | ............... | E04H 6/04 52/67 |
| 2,642,162 A * | 6/1953 | Herrmann | ............... | E04B 1/344 52/108 |
| 2,742,674 A * | 4/1956 | Melder | ............... | E04H 6/02 52/64 |
| 3,996,704 A * | 12/1976 | Huey | ............... | E04H 6/005 52/206 |
| 4,133,148 A * | 1/1979 | Swenumson | ............... | E04H 6/02 160/114 |

(Continued)

FOREIGN PATENT DOCUMENTS

| | | | | |
|---|---|---|---|---|
| CH | 692365 A5 * | 5/2002 | ............. | E04H 6/005 |
| FR | 2449766 A1 * | 9/1980 | ............. | E04H 6/005 |
| GB | 2481978 A * | 1/2012 | ............... | B62H 3/00 |

*Primary Examiner* — Adriana Figueroa
*Assistant Examiner* — Jessie T Fonseca
(74) *Attorney, Agent, or Firm* — McAndrews, Held & Malloy, Ltd.

(57) ABSTRACT

Embodiments of the present disclosure are directed to a bicycle storage unit that comprises an enclosure defining an interior compartment that is sized to hold a bicycle. The enclosure has first and second sidewalls, each of the first and second sidewalls having a frame with a curved upper element and one or more side panels. The enclosure also comprises a curved rear panel and a curved door panel, the curved door panel being movable between a closed position and an open position. Embodiments of the bicycle storage unit are configured so that when the door is in the open position, the bicycle storage unit does not take up any more public space than when the door is in the closed position. Moreover, embodiments of the bicycle storage unit include a locking mechanism that allows a user to utilize a conventional bicycle U-lock to secure the door in a closed position.

10 Claims, 5 Drawing Sheets

(56) References Cited

U.S. PATENT DOCUMENTS

| | | | | |
|---|---|---|---|---|
| 4,229,956 A | * | 10/1980 | Thorburn | E05B 35/08 |
| | | | | 292/137 |
| 4,306,390 A | * | 12/1981 | Brown | A63G 25/00 |
| | | | | 52/64 |
| 5,287,710 A | * | 2/1994 | James | E05B 17/20 |
| | | | | 292/148 |
| D352,117 S | * | 11/1994 | Taylor | D25/16 |
| 5,507,121 A | * | 4/1996 | Taylor | E04H 6/005 |
| | | | | 49/40 |
| 6,341,451 B1 | * | 1/2002 | Morton, Sr. | E04H 6/04 |
| | | | | 52/64 |
| D627,480 S | * | 11/2010 | Pinke | D25/18 |
| D691,549 S | * | 10/2013 | Kara | D12/402 |
| 2002/0095960 A1 | * | 7/2002 | Grover | E04H 6/005 |
| | | | | 70/233 |
| 2007/0022670 A1 | * | 2/2007 | Herter | E04H 6/04 |
| | | | | 52/79.1 |
| 2008/0244862 A1 | * | 10/2008 | Tooyama | E05F 5/003 |
| | | | | 16/82 |
| 2009/0307992 A1 | * | 12/2009 | Kea, Jr. | E04H 6/005 |
| | | | | 52/66 |
| 2015/0102714 A1 | * | 4/2015 | Gonzalez Hernandez | B62H 3/08 |
| | | | | 312/237 |

\* cited by examiner

BICYCLE STORAGE UNIT

BACKGROUND OF THE INVENTION

Using bicycles as a means for public transportation has drastically increased in the last several years. Whether it's a way to school, work or play, bicycles have traditionally been stored on a metal bike rack and secured by a bicycle lock, such as a conventional U-lock. One issue with bicycle racks, however, is bike theft. Further, bicycle racks provide no protection to the bike from the weather or from people or vehicles. Bicycle storage units have more recently become popular. Typically, people who pay for access to the bicycle storage unit have a key, a code, or a pass to open what looks like a giant shed. Multiple bikes are usually stored in the interior, making the unit function like an indoor bicycle rack with the added security of the shed itself. These bicycle storage units take up a large area of space because they are designed for multiple bikes and need to be large enough for people to navigate inside and get their bike out while not disturbing the others. Further, the storage units typically have large doors, which require a large swing radius for opening, causing the space requirement to be very large. And, similar to the public bike racks discussed earlier, there is still a level of public access to the bikes that can lead to bike theft, vandalism, and the like.

SUMMARY OF THE INVENTION

It is the object of at least one embodiment of the present disclosure to provide a bicycle storage unit that will serve as a safe, secure and cost efficient way to provide individual bicycle storage space. The bicycle storage unit comprises two sidewalls, each of which may include a frame and one or more side panels. The frame may comprise a base element, a center post and a curved upper element. The center post may bisect the curved upper element, dividing it into a front portion and a rear portion. The one or more side panels span between the curved upper element and the base element of the frame. In some embodiments, the sidewalls may be arranged so that when multiple bicycle storage units are set up in a row, the sidewall between adjacent storage units (e.g. a first storage unit and a second storage unit) may be shared, making the bicycle storage unit modular, as well as space and cost efficient. In some embodiments, the side panels may comprise a plurality of ventilation holes for temperature control and/or visibility inside the bicycle storage unit.

The bicycle storage unit also comprises a rear wall and a curved front door. The rear wall comprises a curved rear panel that spans between the rear portions of the two sidewall upper frame elements. The curved front door is movable between a closed position and an open position. When the curved front door is in the closed position, it spans between the front portions of the two sidewall upper frame elements, serving to close off the interior compartment. When the curved front door is in the open position, the interior compartment is accessible between the front portions of the upper frame elements of the two sidewalls. When moved to the open position, for instance, the curved front door may be rolled upward so as to be substantially adjacent to the rear wall (i.e. so as to substantially span between the rear portions of the two sidewall upper frame elements).

The bicycle storage unit may also comprise an interior tray. The tray is located in the interior compartment of the bicycle storage unit and is configured to support a bicycle in the upright position. In some embodiments, the tray may comprise one or more surfaces to which a bicycle may be locked using a conventional bicycle lock.

In some embodiments, the bicycle storage unit may comprise one or more dampers that are configured to slow the speed at which the door moves from the open position to the closed position. The dampers may prevent unintended closing of the door. The dampers may also prevent the door from descending rapidly and slamming shut. In some embodiments, the bicycle storage units may comprise one or more springs that are configured to assist a user in moving the door from the closed position to the open position. By relieving some of the weight from the curved door, the springs facilitate the movement of the door so less work is required by the user.

It is another object of at least one embodiment of the present disclosure to provide a bicycle storage unit comprising a locking element by which the door can be locked in the closed position. For instance, embodiments of the bicycle storage unit may comprise a curved front door that is lockable in the closed position by a bicycle U-Lock, a padlock, a key, or a combination thereof. In some embodiments, for instance, the locking element on the bicycle storage unit may comprise a locking bar that is slidable between a first, locked position and a second, unlocked position. The locking element may further comprise a plate with an aperture that is sized to accommodate a standard bicycle U-Lock, such that placement of a bicycle U-Lock through the aperture serves to prevent the locking bar from sliding between the locked position and the unlocked position. Because the U-Lock is a standard way to lock bicycles to a traditional bike rack, embodiments of the present disclosure provide a convenient way for users to utilize this same lock (which many bikers always have with them when biking) to secure a bicycle within the interior compartment of the storage unit.

It is another object of at least one embodiment of the present disclosure to provide a bicycle storage unit that is sized and configured to contain a single bicycle within an interior compartment while taking up little more public space than the bicycle itself. For instance, the bicycle storage unit may comprise a shelter that curves from a front edge located substantially at ground level to a central point located between about 45 inches and about 55 inches above ground level and curves back down to a rear edge located substantially at ground level. The length of the shelter, e.g. between the front edge and the rear edge, may be between about 73 inches and about 83 inches, which is generally slightly greater than the length of a conventional bicycle. The width of the enclosure may be between about 30 inches and about 35 inches, which is generally slightly greater than the width of a conventional bicycle. The bicycle storage unit may comprise a front door that is movable between a closed position in which an interior of the bicycle storage unit is inaccessible and an open position in which the interior of the bicycle storage unit is made accessible. In the open position, the door may span between the rear portions of the upper frame elements, making the interior compartment accessible without requiring any extra public space, such would be required by conventional outward swinging doors.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
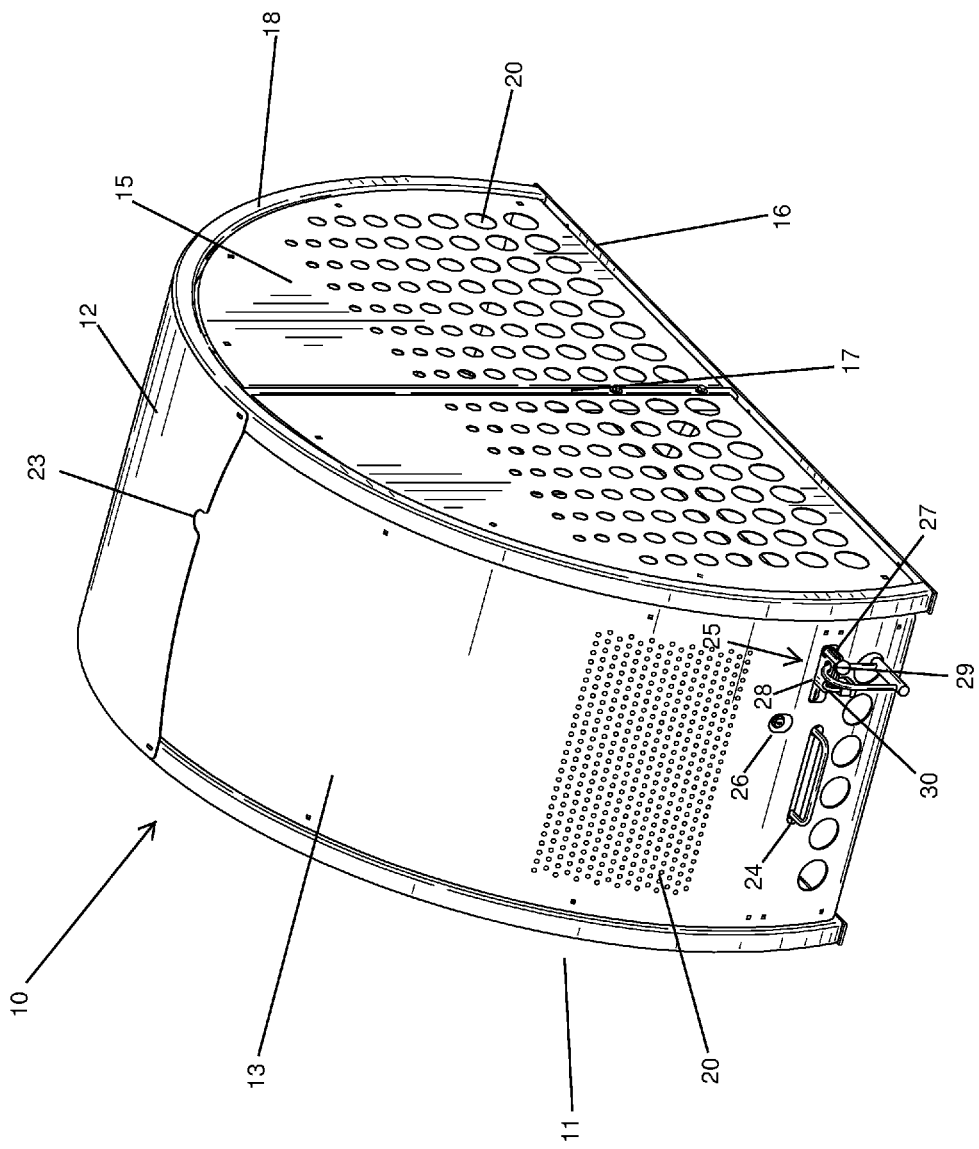
FIG. 1 is a perspective view of an embodiment of a bicycle storage unit of the present disclosure.
Figure 2:
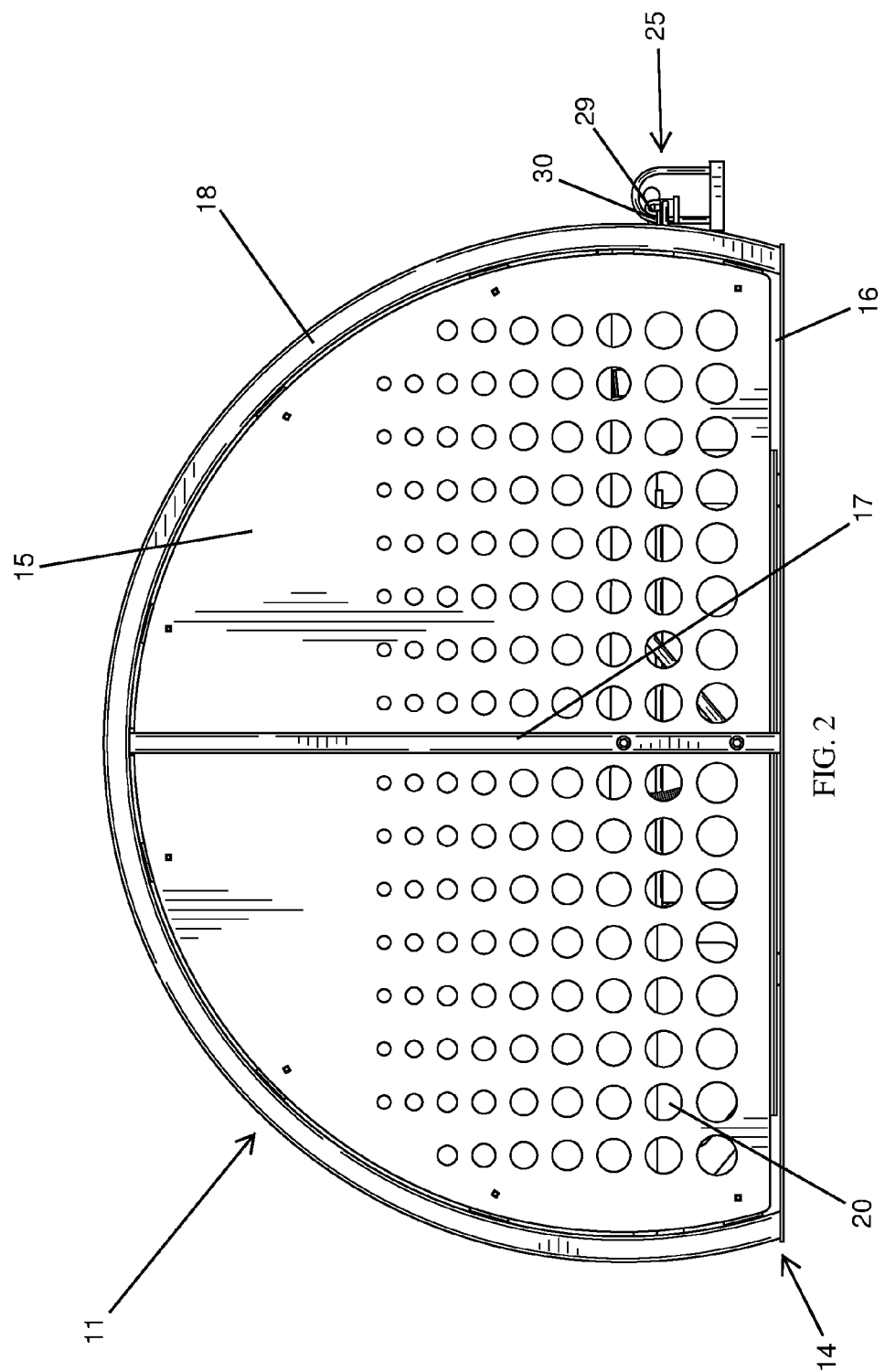
FIG. 2 is a side view of an embodiment of a bicycle storage unit of the present disclosure.

FIGS. 1 through 5 show a bicycle storage unit 10 of an embodiment of the present disclosure. The bicycle storage unit 10 comprises first and second sidewalls 11, a rear wall 12, and a curved door 13.

In some embodiments, the bicycle storage unit 10 may contain first and second sidewalls 11 that are spaced apart from one another at a distance that allows for a single bicycle to be placed in the space between the sidewalls. For instance, in some embodiments, the first and second sidewalls 11 may be spaced between about 25 inches and about 40 inches apart from one another, alternatively between about 30 inches and about 35 inches apart from one another. Moreover, each sidewall may have a length between about 73 inches and about 83 inches, which is generally slightly larger than the length of a conventional bicycle. Each sidewall may comprise a frame 14, and one or more side panels 15.

The frame 14 may comprise a lower base element 16, a center post 17, and a curved upper element 18. The lower base element spans 16 the length of the sidewall 11, and in general is configured to have a length that is slightly longer than the length of a standard bicycle. The lower base element 16 is configured to rest directly on a ground surface on which the bicycle storage unit is mounted. In some embodiments, the lower base element 16 may comprise one or more base plates having one or more apertures that are situated to allow for the use of bolts to secure the lower base element to the ground surface on which bicycle storage unit is mounted. The lower base element 16 may be affixed to the curved upper element 18 at or near each end. Moreover, a center post 17 may be affixed to the lower base element 16 at or near its center.

The curved upper element 18 comprises one or more curved structures that extend from a front end located at or near ground level on a curve up to a maximum central height and then extend on a curve down to a rear end located at or near ground level. In some embodiments, for instance, the maximum central height may be between about 45 inches and 55 inches above the ground surface on which the bicycle storage unit is mounted. By utilizing a curved upper element 18, the bicycle storage unit shown in FIGS. 1-5 creates enough space to maneuver and store a bicycle therein while conserving public space requirements and material costs.

In some embodiments, the curved upper element 18 comprises one or more square tubes. The curved upper element 18 extends from one end of the lower base element 16 to the other end of the lower base element. The front and rear ends of the curved upper element 18 may be attached directly to the lower base element 16. In alternative embodiments, the front and rear ends of the curved upper elements may be adjacent to the ends of the lower base element, in which case the curved upper element may be separately secured to the ground surface on which the bicycle storage unit is mounted.

In some embodiments, the frame 14 may also comprise a center post 17. The center post 17 may bisect the sidewall and the frame 14, e.g. the lower base element 16 and the curved upper element 18, into a front portion and a rear portion. The center post 17 may span between a top end, which is affixed to the curved upper element 18, and a bottom end, which is affixed to the lower base element 16. In alternative embodiments, the bottom end of the center post 17 may be adjacent to the lower base element 16, in which case the center post may be separately secured to the ground surface on which the bicycle storage unit is mounted. The center post 17 is desirably substantially perpendicular to the lower base element 16 and the ground surface.

The sidewall frame 14 is desirably configured to support the mechanisms that provide for movement of the curved door 13 between open and closed positions. For example, the curved upper element 18 may be configured to support a door frame, which may include a track on which the curved door 13 is configured to move. In some embodiments, for example, the door frame may be affixed to the front portion of the curved upper element 18, the rear portion of the curved upper element, or both. In some embodiments, the door frame may also be connected to the center post 17, such as through a connecting panel, to provide additional structural support. Alternatively, the door frame, including for instance the track, may be built directly into the curved upper element 18.

The sidewall frame 14 may also be configured to support the springs 34 and/or dampers 35 that may be located in the interior compartment 22. For example, the springs 34 and/or dampers 35 may be attached to and supported by the central post 17 of the frame 14. The springs 34 and/or the dampers 35 may also be attached to and supported by other elements of the frame 14 such as the curved upper element 18 or the lower base element 16. Alternatively, the springs 34 and/or dampers 35 may be attached to the side panels 15.

The sidewall 11 also desirably comprises one or more side panels 15. In the illustrated embodiment, for instance, the sidewall 11 comprises two side panels 15, with a first side panel spanning between the lower base element 16 and the curved upper element 18 in the front portion of the frame and a second side panel spanning between the lower base element and the curved upper element in the rear portion of the frame. In an alternative embodiment, each sidewall 11 may comprise a single side panel 15, which spans over the center post 17. In another alternative embodiment, the frame 14 may not comprise a center post 17 and the sidewall may only comprise a single side panel 15 that spans between the lower base element 16 and the curved upper element 18.

The side panels 15 may be made of a variety of materials, including metals and plastics. In some embodiments, the side panels 15 may be made of aluminum, which is a sturdy yet light material. In some embodiments, one or more side panels 15 may contain ventilation holes 20. The ventilation holes 20 may be configured to provide for temperature regulation. The ventilation holes 20 may also be configured for visibility into the interior compartment 22 of the bicycle storage unit 10, which may be useful at high security areas such as airports, and/or for a potential user to easily identify whether a unit is already in use.

The rear portions of the two sidewalls 11 are adjoined by a rear wall 12. The rear wall 12 may comprise one or more curved sheets of material that span between the rear portions of the upper curved elements 18 of the first and second sidewalls 11. The rear wall may be made of a variety of materials, including metals and plastics. In some embodiments, for example, the rear wall may comprise a thin sheet of aluminum. The rear wall 12 may be attached to the rear portions of the curved upper frame elements 18 of the first and second sidewalls 11. As in the illustrated embodiment, for example, the rear wall may be attached to the upper surface of the curved upper frame elements 18. Alternatively, the rear wall may be attached to the lower (e.g. interior) surface of the curved upper frame elements 18. In some embodiments, a lower portion of the rear wall may also be attached to the base element 16 of the sidewall. In some embodiments, the bottom edge 19 of the rear wall may touch the ground whereas in other embodiments, the bottom edge of the rear wall may sit slightly above the ground. In some embodiments, the rear wall 12 may comprise ventilation holes 20 for temperature regulation and/or visibility into the interior space.

Figure 3:
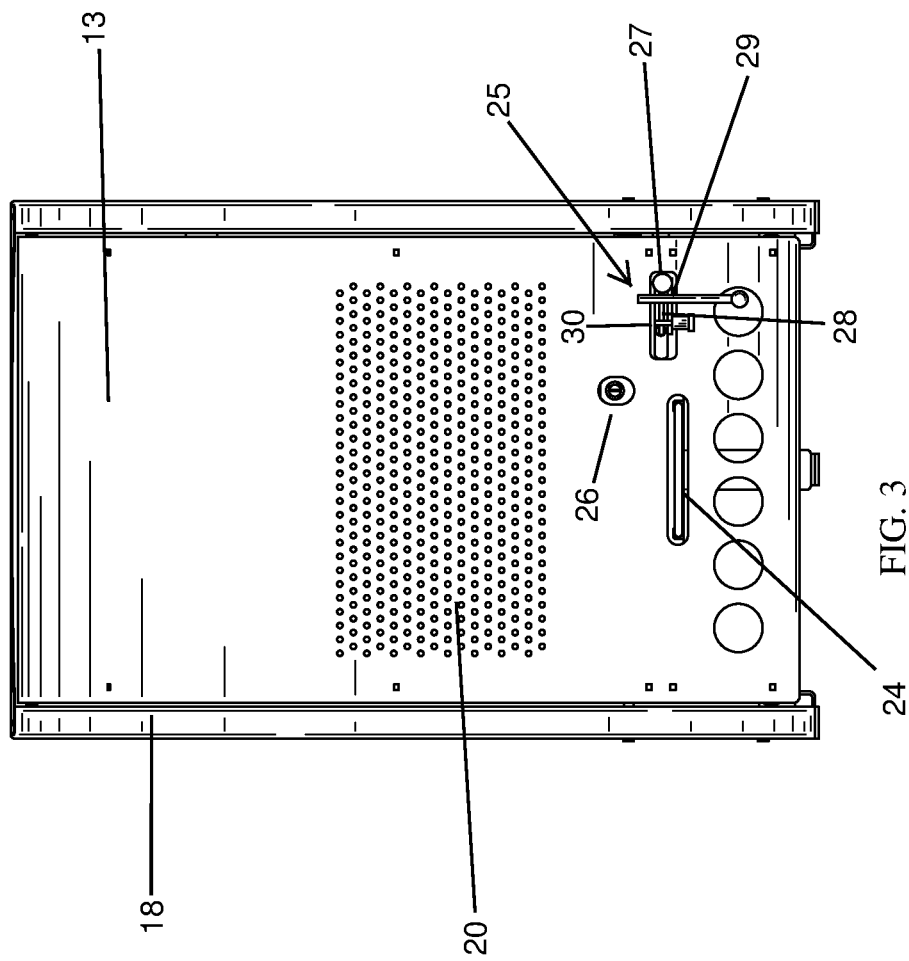
FIG. 3 is a front view of an embodiment of the bicycle storage unit of the present disclosure showing the curved door in the closed position.

The bicycle storage unit also comprises a curved door 13, which is movable between an open position and a closed position. FIGS. 1 and 3 show an embodiment of the bicycle storage unit 10 where the curved door is in the closed position. The curved door 13 may be comprised of one or more curved sheets of material that spans between the upper curved elements 18 of the first and second sidewalls 11. The curved door 13 may be made of a variety of materials, including metals and plastics. In some embodiments, for example, the curved door 13 may comprise a thin sheet of aluminum or a thin sheet of stainless steel.

The curved door 13 may be movably attached to the front portions of the curved upper frame elements 18 of the first and second sidewalls 11 and/or to the door frames affixed to the curved upper frame elements 18. For instance, the curved door 13 may comprise one or more rollers 21, the one or more rollers being configured to roll along the curved upper frame elements 18 of the first and second sidewalls 11 or the door frames affixed to the curved upper frame elements 18. For instance, each of the rollers 21 may be aligned to cooperate with a track upon which the rollers are configured to roll, allowing the curved door 13 to slide from a closed position as displayed in FIGS. 1 and 3 to an open position as displayed in FIG. 4. Each roller 21 may comprise one or more wheels, which are attached to the door, such as through bolts. For instance, a first wheel may be attached to a bottom, first side (e.g. right) corner of the curved door and cooperate with a track on the curved upper portion 18 of the first sidewall 11 and a second wheel may be attached to a bottom, second side (e.g. left) corner of the curved door and cooperate with a track on the curved upper portion of the second sidewall. Additional wheels may be provided at the top corners of the curved door 13. The one or more rollers 21 are desirably located on the interior side of the curved door 13. In alternative embodiments, the one or more rollers 21 may be present on, or attached to, the upper frame elements 18 and the curved door 13 may comprise a track that is configured to slide along the one or more rollers.

As illustrated in FIGS. 1 and 3, when in the closed position, the curved door 13 spans between the front portions of the curved upper frame elements 18 of the first and second sidewalls 11. Accordingly, when the curved door 13 is in the closed position, the interior compartment 22 of the bicycle storage unit is not accessible.

Figure 4:
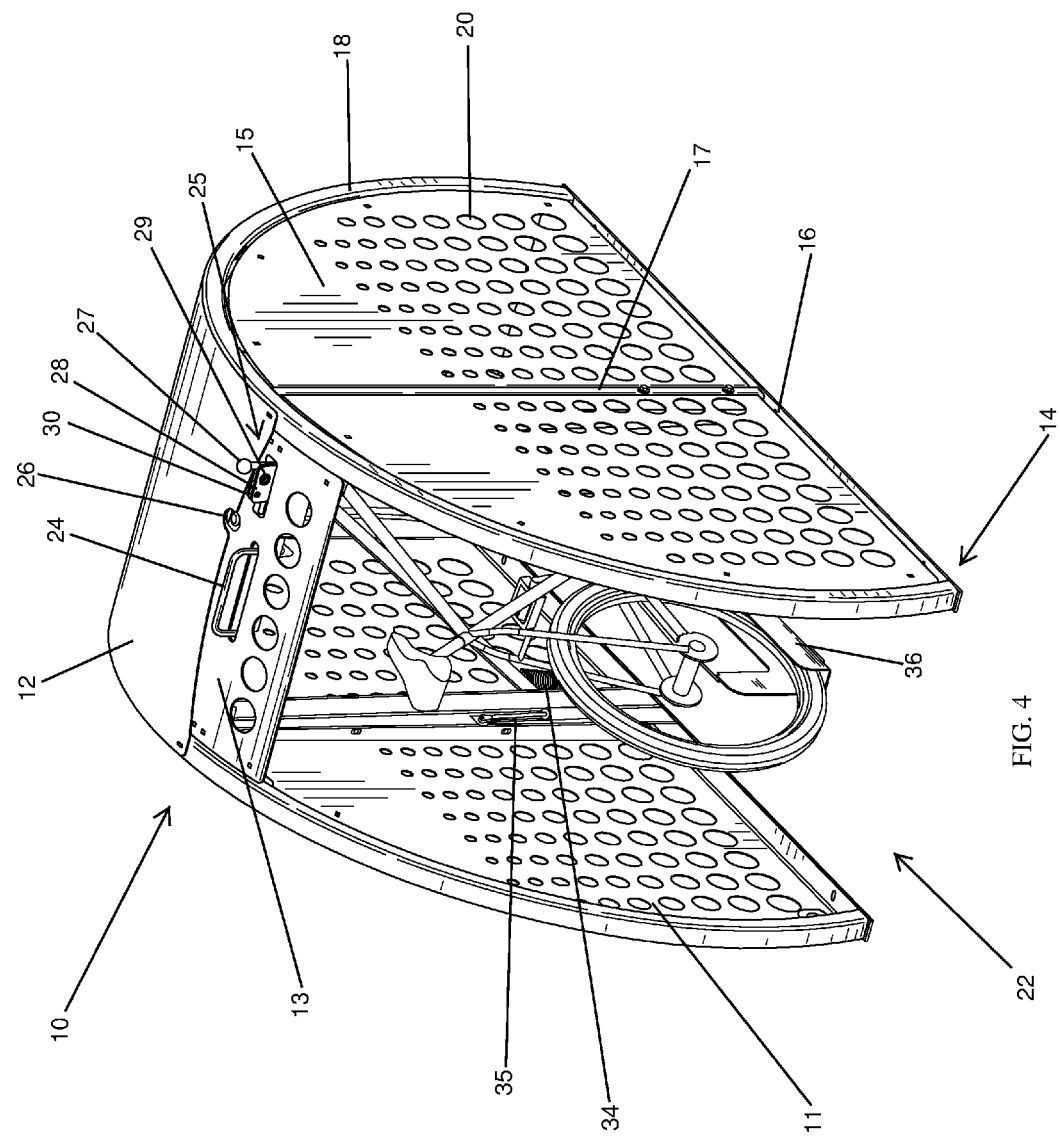
FIG. 4 is a perspective view of an embodiment of the bicycle storage unit of the present disclosure showing the curved door in the open position and showing the interior compartment of the storage unit.

As illustrated in FIG. 4, when the curved door 13 is in the open position, the door substantially spans between the rear portions of the curved upper frame elements 18 of the first and second sidewalls 11. Note that the term "substantially" is used because a lower portion of the curved door 13 may still span between the front portions of the curved upper frame elements 18 of the first and second sidewalls 11, as in the embodiment illustrated in FIG. 4. It is desirable that this portion is kept relatively small, however, in order to provide an adequately large opening through which to access the interior compartment 22.

In this position, the interior compartment 22 of the bicycle storage unit is accessible and the curved door 13 is out of the way. For instance, in the open position, the curved door 13 will slide adjacent to the rear wall 12 to prevent taking up extra space. For instance, as shown in FIG. 4, the curved door 13 may slide underneath the rear wall 12. In alternative embodiments, the curved door 13 may slide over the top of the rear wall 12. In the open position, the curved door 13 does not interfere with insertion of a bicycle into the interior compartment 22 and/or removal of a bicycle from the interior compartment.

In some embodiments, such as where the door 13 slides underneath the rear wall 12, the rear wall may comprise one or more cut-out areas 23 that are configured to receive one or more protruding elements of the curved door 13. For instance, the rear wall 12 may comprise a cut-out area for the one or more locking elements, the handle, or the like. As illustrated in FIG. 4, for example, in embodiments in which the bicycle storage unit 10 is configured to be locked and unlocked using a key, the rear wall 12 may comprise a cut-out area 23 that is configured to receive the key where the key is left in the door when the door is moved to the open position.

In some embodiments, the storage unit 10 may comprise one or more springs 34 that are configured to assist a user in moving the curved door 13 from the closed position to the open position. The springs 34 may make movement of the curved door 13 from the closed position to the open position easier by relieving some of the weight from the door. In other embodiments, there may be no springs 34 that assist a user in moving the door. In some embodiments, the storage unit 10 may also comprise one or more dampers 35 that are configured to slow the speed at which the door moves from the open position to the closed position. The dampers 35 may serve as a safety feature by preventing the curved door 13 from slamming shut when the user is moving the curved door from the open position to the closed position. In other embodiments, there may be no dampers 35 that assist a user in closing the curved door 13.

The curved door 13 may also preferably comprise a handle 24. The handle 24 may be located near the bottom edge of the curved door 13 in order to allow a user to easily grip the door so as to move the door between the open and closed positions. In some embodiments, the curved door 13 may also comprise one or more ventilation holes 20.

The curved door 13 may comprise one or more locking elements 25. The one or more locking elements 25 are configured to secure the curved door 13 in a closed position, such that the owner of a bicycle alone is able to open the door and retrieve the bicycle stored within the interior compartment 22 of the storage unit 10. In some embodiments, the locking element 25 may comprise a locking bar 27 and a plate 28. The locking bar 27 may be slidable between a first, locked position and a second, unlocked position. In some embodiments, such as that illustrated in the Figures, the locking bar 27 may extend from the front of the curved door 13. The plate 28 may be located adjacent to the locking bar 27. For instance, the plate 28 may extend from the front of the curved door 13 and be located slightly above, slightly below, or to either side of the locking bar 27. In alternative embodiments, the locking bar 27 may be replaced by, for instance, a locking knob that may be rotated between a locked position and an unlocked position.

The plate 28 may comprise an aperture 29 that is sized and configured to accommodate a standard bicycle U-lock, wherein placement of a bicycle U-lock through the aperture 29 serves to prevent the locking bar 27 from sliding between the locked position and the unlocked position (where a locking knob is used, placement of a bicycle U-lock through the aperture may serve to prevent the locking knob from rotating into the unlocked position). In this way, the user would be able to use a conventional bicycle U-Lock 29 to secure a bicycle within the interior compartment 22. In another embodiment, the plate 28 may comprise an aperture 30 that is sized and configured to accommodate a conventional padlock, wherein placement of the padlock through the aperture serves to prevent the locking bar 27 from sliding between the locked position and the unlocked position. In some embodiments, such as that illustrated in the Figures, the locking plate 28 may include both a first aperture 29 configured to accommodate a standard bicycle U-lock and a second aperture 30 configured to accommodate a conventional padlock. In these embodiments, a user may select which of the two lock types to use in order to secure the curved door 13 of the storage unit 10 in a closed position.

In some embodiments, the one or more locking elements 25 may comprise a key lock 26, where a user would be provided with a key that would allow access to the interior compartment 22. In other embodiments, the locking element 25 may comprise a manual or digital keypad, which allows the user to type in a code to unlock the locking element and gain access to the interior compartment 22. In yet other embodiments, the locking element 25 may comprise a combination lock and the user may access the interior compartment 22 by inputting the proper sequence of numbers on the combination lock.

A tray 36 configured to support a bicycle in an upright position may be located within the interior compartment 22. For example, the tray 36 may comprise one or more elements that are configured to secure the bicycle in an upright position on the tray, such as an element that receives the front tire of a bicycle. In some embodiments, the tray 36 may comprise one or more surfaces to which a bicycle may be locked using a conventional bicycle lock. In some embodiments, the tray 36 is attached to the ground surface on which the bicycle storage unit is mounted, such as through the use of bolts. In some embodiments, an upper element of the tray 36 may be configured to be movable, such that the tray may be moved frontward to enable access. For instance, in some embodiments the tray 36 may be slidable on a track or the like such that at least a portion of the tray may extend outside of the interior compartment 22 of the bicycle storage unit.

In addition to supporting the bicycle in an upright position, the tray 36 may also provide protection for the bicycle from any elements (such as rain, snow, spilled liquids, and the like) that may enter the bicycle storage unit. In some embodiments, the bicycle storage unit may comprise a floor element, which would provide additional protection against outside elements. The floor element may span between the bottoms of the two sidewalls and between the bottoms of the rear wall and the front door. In some embodiments, for instance, the bicycle storage unit may be configured so that a user may simply place a bicycle in the storage unit without placing it on a tray 36.

Figure 5:
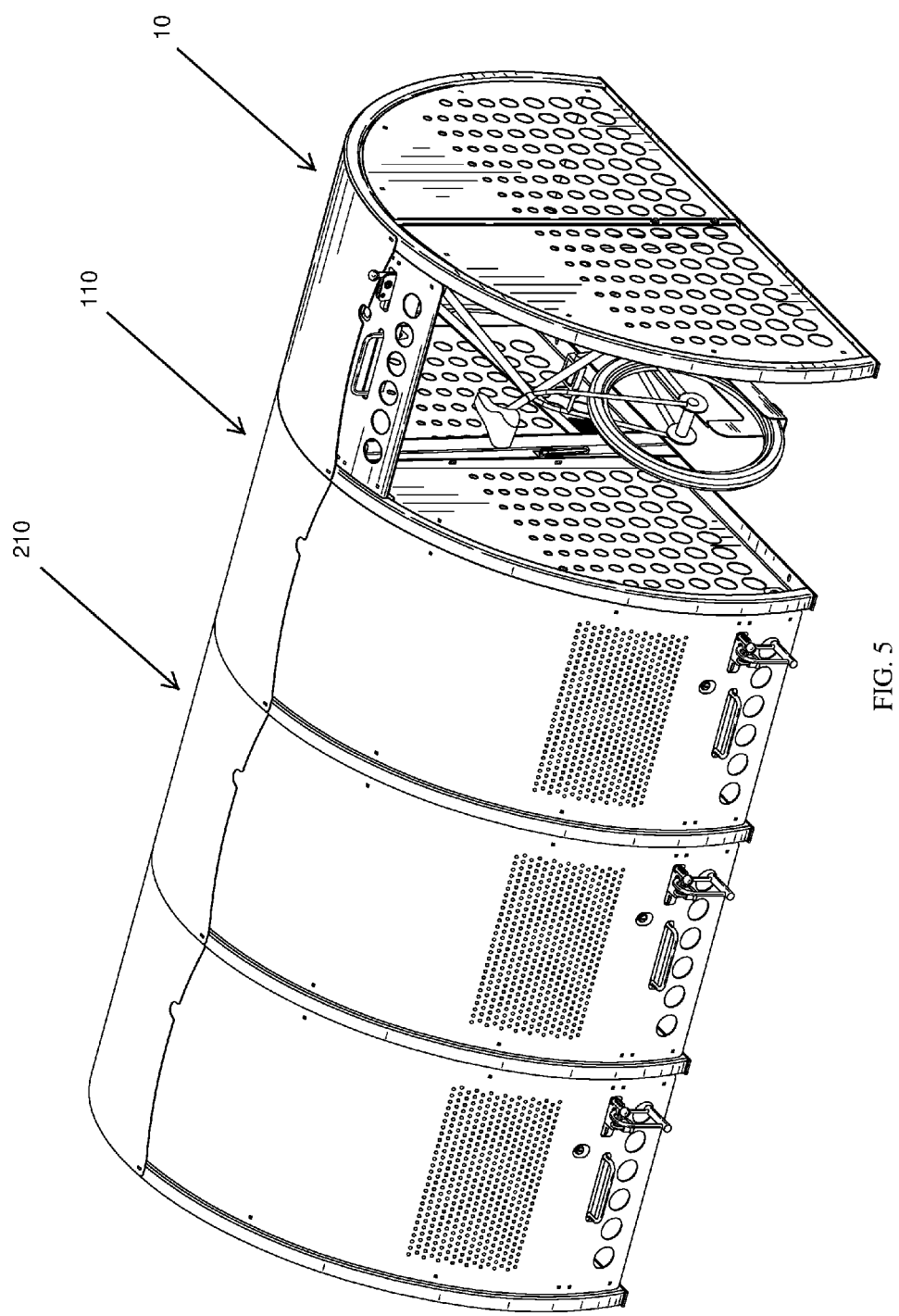
FIG. 5 is a perspective view of an embodiment of the bicycle storage unit of the present disclosure, showing multiple storage units arranged next to one another, with adjacent units sharing a common sidewall.

FIG. 5 shows several bicycle storage units 10 of an embodiment of the present disclosure connected together in series. Notably, the second sidewall 11 for the first bicycle storage unit 10 may also operate as the first sidewall for the second 110 bicycle storage unit. The second bicycle storage unit may share its first sidewall 11 with the first bicycle storage unit 10 and its second sidewall with a third bicycle storage unit 210. Desirably, as shown in the embodiment of FIG. 5, each bicycle storage unit may share at least one sidewall with an adjacent bicycle storage unit. In some embodiments, the one or more sidewall panels 15 may be omitted on internal sidewalls 11, i.e. sidewalls that are enclosed by two adjacent interior compartments 22. By having the sidewalls be shareable in this manner, the amount of components (as well as associated costs) and the space required by the bicycle storage units of the present disclosure are both significantly decreased. It also provides for a modular bicycle storage system, in which a desired amount of bicycle storage may easily be provided for a variety of locations.

It can be seen that the described embodiments provide a unique and novel bicycle storage unit that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A bicycle storage unit comprising an enclosure defining an interior compartment that is sized to hold a bicycle, the enclosure comprising
    first and second sidewalls, each of the first and second sidewalls comprising
        a frame having a lower base element, a center post, and a curved upper element, the center post bisecting the curved upper element into a front portion and a rear portion; and
        one or more side panels spanning between the curved upper element and the lower base element;
    a rear wall comprising a curved rear panel spanning between the rear portions of the curved upper elements;
    a curved door that is movable between a closed position and an open position, wherein
        in the closed position, the door spans between the front portions of the curved upper elements to close off the interior compartment;
        in the open position, the door substantially spans between the rear portions of the curved upper elements, such that the interior compartment is accessible between the front portions of the curved upper elements;
    one or more dampers that slow the speed at which the door moves from the open position to the closed; and
    one or more springs that assist a user in moving the door from the closed position to the open position.

2. The bicycle storage unit of claim 1, wherein each of the side panels comprises one or more ventilation holes.

3. The bicycle storage unit of claim 1, further comprising a tray located in the interior compartment and configured to support a bicycle in an upright position.

4. The bicycle storage unit of claim 3, the tray further comprising one or more surfaces to which a bicycle may be locked using a bicycle lock.

5. The bicycle storage unit of claim 1, the enclosure further comprising a locking element by which the door can be locked in the closed position.

6. The bicycle storage unit of claim 5, wherein the locking element comprises a key lock.

7. The bicycle storage unit of claim 5, wherein the locking element comprises:
- a locking bar that is slidable between a first, locked position and a second, unlocked position; and
- a plate, the plate comprising an aperture that is sized to accommodate a bicycle U-Lock, wherein placement of the bicycle U-Lock through the aperture serves to prevent the locking bar from sliding between the locked position and the unlocked position.

8. The bicycle storage unit of claim 1, wherein the first and second sidewalls are spaced between about 30 inches and about 35 inches apart from one another.

9. The bicycle storage unit of claim 8, wherein the curved upper element of the frame spans from the ground to a height between about 45 inches and about 55 inches above the ground.

10. The bicycle storage unit of claim 1, further comprising a second bicycle storage unit and wherein one of the first and second sidewalls also operates as a sidewall for an enclosure of the second bicycle storage unit.

* * * * *